Aug. 20, 1957  E. W. McCAUL ET AL  2,803,198
RAIL TERMINAL DRIVE LINE INSTALLATION
Filed June 18, 1952  2 Sheets-Sheet 1
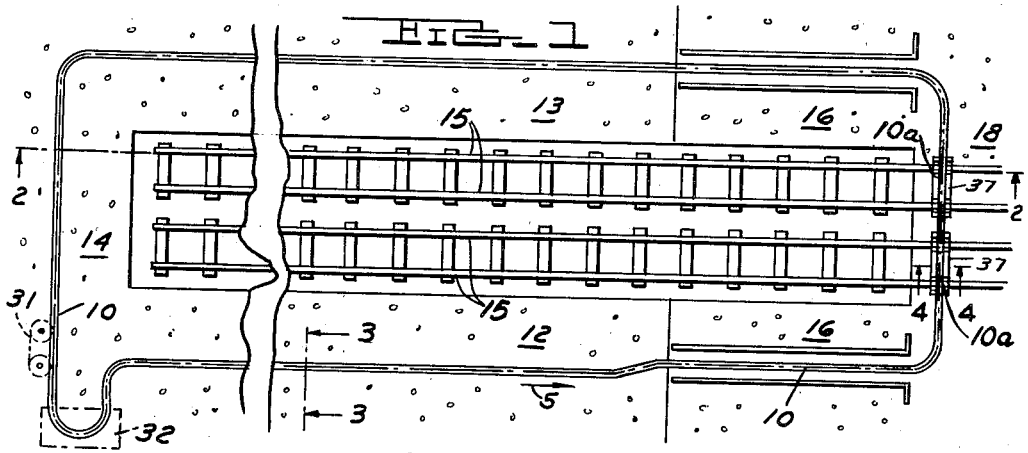
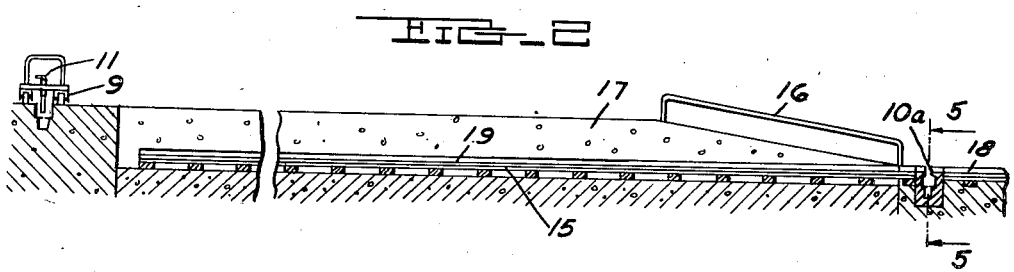
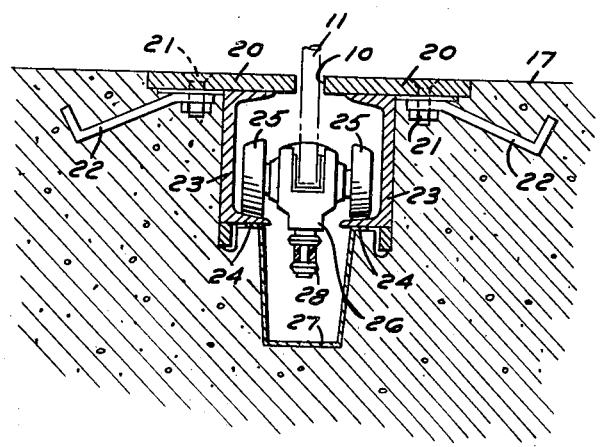
INVENTORS
EDWARD W. McCAUL
BY STEVEN W. JESSOP
Farley Forster & Farley
ATTORNEYS

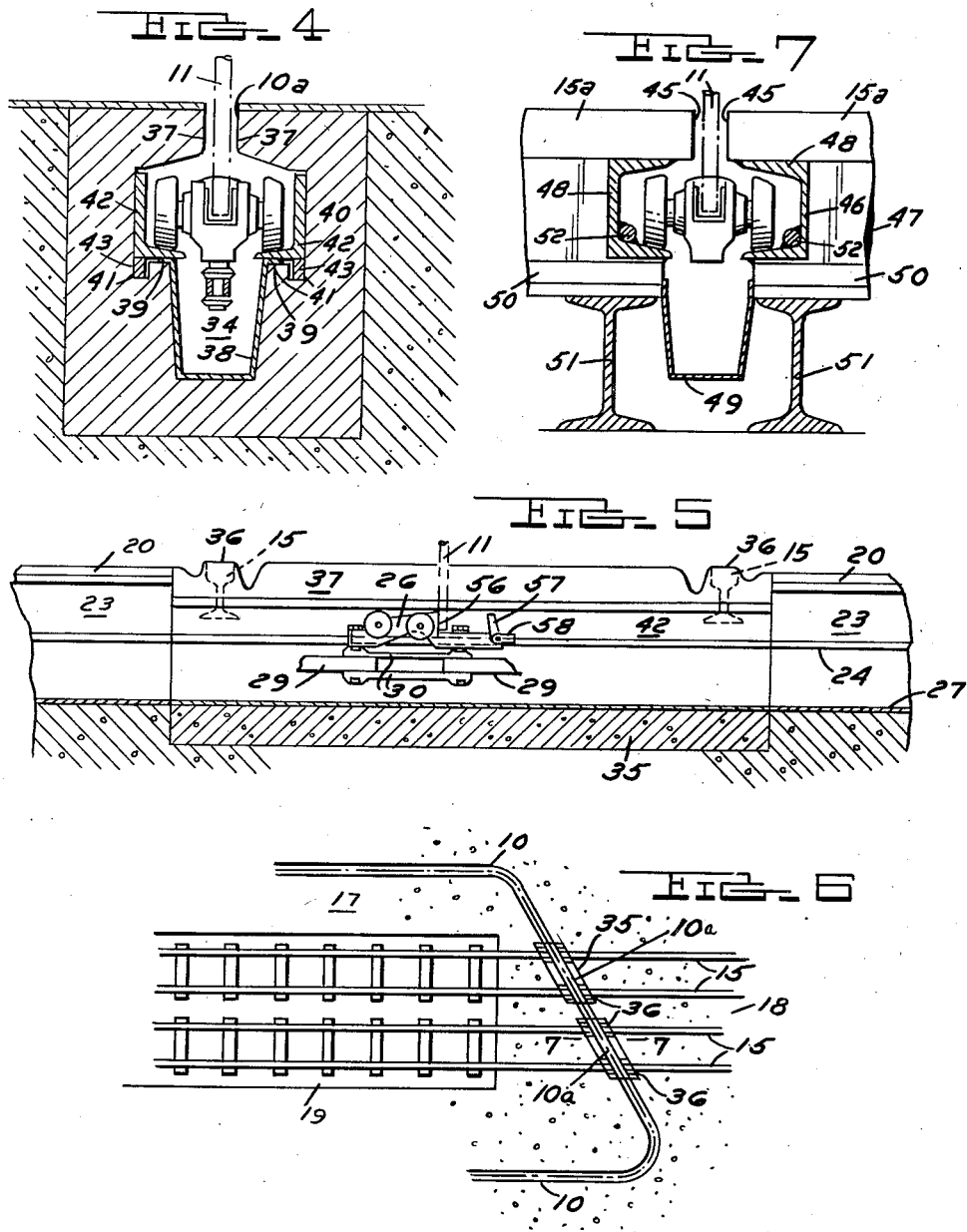

United States Patent Office 2,803,198
Patented Aug. 20, 1957

2,803,198

RAIL TERMINAL DRIVE LINE INSTALLATION

Edward W. McCaul, Birmingham, and Steven W. Jessop, Detroit, Mich., assignors to Jervis B. Webb Company, Detroit, Mich., a corporation of Michigan Application June 18, 1952, Serial No. 294,136

2 Claims. (Cl. 104—170)

This invention relates to a drive line system particularly suited for installation in railroad terminals to provide an endless propelling member traveling in a loop for moving carriers along loading docks.

The invention contemplates the use of a type of drive line such as disclosed in United States Patent 2,621,610 issued December 16, 1952, wherein a propelling member, moving beneath a guide slot formed at floor level, is utilized to impart movement to wheeled floor supported carriers through the engagement of a drive pin provided on said carriers, which when lowered through the floor level slot, will be engaged by driving devices carried by the propelling member.

In spite of the great amount of material handling which takes place in rail terminals, the employment of mechanical carrier propelling installations has been very limited, especially in that type of terminal where the loading docks extend parallel to and adjacent the railroad tracks. Such docks are usually relatively narrow, and their restricted service area has made the installation of closed loop drive line systems impractical. Even assuming adequate room at the outer end of the dock for a reversal in direction of the line, the presence of an outgoing and an incoming line on the same dock would be hazardous and would not ordinarily leave sufficient room for normal loading and unloading operations as well as servicing of the railroad equipment.

The present invention makes a drive line installation for a rail terminal practical under conditions such as outlined above by employing but a single line on any loading dock having a limited service area, extending this line beyond the end of the loading dock while changing its level, if necessary, from the level of the dock to the level of the railroad track, employing a crossover section to carry the line under the railroad track and locating the return line on a separate loading dock. In this manner the installation forms a loop extending out one loading dock across the railroad tracks and back an adjacent dock with a connecting portion along the main section of the dock lying beyond the terminus of the railroad track.

Principal advantages of this system are that a minimum amount of space is required on any loading dock for the drive line installation; the direction of traffic along the drive line on any loading dock is always in the same direction; and, where practical, railroad dispatching may be coordinated with the operation of the drive line so that outgoing trains are serviced at loading docks along which a carrier is traveling in an outbound direction, with the inbound direction of carrier travel being utilized for the servicing of inbound railroad traffic.

The over-all layout and constructional details of a typical installation of the invention are given in the accompanying drawings which comprise the following views:

Fig. 1, a plan view showing representative loading docks surrounding the terminus of a pair of railroad tracks and showing the drive line installation of the invention extending out one dock across the pair of railroad tracks and back on the other dock;

Fig. 2, a sectional view in elevation taken along the line 2—2 of Fig. 1;

Fig. 3, a sectional view along the line 3—3 of Fig. 1 showing a representative drive line construction as installed along the length of the loading dock;

Fig. 4, a sectional view along the line 4—4 of Fig. 1 showing the cross-sectional construction of a special railroad drive line crossover member;

Fig. 5, a sectional view along the line 5—5 of Fig. 2, also showing the longitudinal construction of this special crossover member;

Fig. 6, a plan view showing an alternate arrangement of the railroad-drive line intersection; and Fig. 7, a sectional view along the line 7—7 of Fig. 6 showing the constructional details of an alternate form of crossover.

Referring first to Figs. 1 and 2, the drive line installation there shown is arranged for counterclockwise rotation as indicated by the arrow 5, the path of the drive line being outlined by a pair of parallel lines. These lines, as can be seen in Figs. 2 and 3, define a guide slot 10 adapted to receive a drive pin 11 (in phantom in Fig. 3), this guide pin being attached to a carrier such as a wheeled truck 9 (Fig. 2) adapted to travel along the surface of the loading docks and carrier supporting surfaces provided at other portions of the installation.

With this direction of drive line travel, the loading dock structure will be described as comprising an outbound dock 12, an inbound dock 13, both of which extend outwardly from a main dock section 14 and lie parallel and adjacent to a pair of railroad tracks. The docks 12 and 13 are positioned at any desired level above the surface of the rails 15 of the railroad tracks and are provided at their outer ends with inclined ramps 16, which lead from the level of the upper surface 17 of the docks to the level of a crossover section 18 which lies at the level of the top 19 of the railroad rails 15.

The general construction of the drive line is conventional, and as shown in Fig. 3, comprises a pair of horizontal plates 20 positioned at the level of the surface 17 of the loading docks and having their adjacent surfaces spaced to form the guide slot 10. These plates 20 are connected by bolts 21 to retaining irons 22 which are imbedded in the concrete structure of the dock. The drive line track is formed of a pair of channel iron members 23 located symmetrically with respect to the center line of the guide slot, the lower flanges 24 of these members forming a pair of tracks which support the spaced wheels 25 of a trolley 26. A U-shaped chain channel is formed by a member 27, this channel lying beneath and intermediate the conveyor track surfaces 24. Supported from the trolley 26 and traveling in this chain channel 27 is a propelling chain 28, of any conventional type which possesses both lateral and vertical flexibility, and as shown in Fig. 5, this chain in the present instance is composed of alternate links 29 interconnected by a pair of side bars 30. The drive line installation includes a standard type of driving unit schematically illustrated at 31 in Fig. 1 and a standard type of chain take-up 32, also schematically illustrated.

At the crossover section 18 of the drive line installation, the drive line and railroad structures merge. The drive line tracks are supported by the railroad structure and the railroad rails form portions of the guide slot of the drive line. Alternate forms of construction for this portion of the system are shown in the drawings, the first in Figs. 4 and 5 and the second in Fig. 7.

In the structure of Figs. 4 and 5, a special crossover casting 35 is employed which is formed with rail sections 36 forming continuations of the railroad rails 15, these rail sections 36 being broken by a guide slot 10a. The walls 37 defining this guide slot act as supporting structure for the rail sections 36, which overhang a drive line tunnel 34 formed through the casting 35, this tunnel including a chain channel portion 38 and a pair of spaced horizontal drive line track supporting surfaces 39. The drive line track portion of the tunnel is bounded by vertical walls 40 which extend downwardly below the track supporting surfaces 39 to form track locating notches 41. The drive line tracks are formed of a pair of angles 42 to each of which a vertically extending track locating rib 43 is connected and is adapted to be positioned in the track locating notch 41.

In the erection of the installation the casting 35 is imbedded in and supported by concrete as shown in Figs. 4 and 5. If desired, the casting 35 may be made so that the drive line track intersects the railroad track at an acute angle as shown in the plan view of Fig. 6. This minimizes the possibility of more than one wheel of a railroad car coming to rest in the slot of the drive line installation.

In the alternate construction of Fig. 7, the railroad rails 15a are spaced apart so that their ends 45 form portions of the walls of a guide slot. A notch 46 is formed in the web 47 of these rails to receive a channel member 48 which forms the drive line track. A U-shaped chain channel 49 is secured between the spaced lower flanges 50 of the rails, which rest upon any suitable supporting members such as the I beams 51. Guide members such as the rods 52 may be employed on the drive line tracks to aid in keeping the trolleys in alignment with the guide slot.

The operation of a drive line installation of this type must necessarily be coordinated with that of train movement along the railroad tracks. Such coordination, however, does not require that the operation of the drive be stopped every time a train movement takes place. The drive may be operated continuously, in which case, it is merely necessary to station an attendant at the approach to the crossover section 18 (preferably in advance of the ramp portion 16 of the installation) to retract the drive pins of any oncoming carriers from the guide slot 10, in the event that a train occupies the crossover section at that particular time. The movement of carriers may take place without interruption along all other portions of the drive line system.

After the train movement has ceased and the crossover section is again clear the drive pins of any carriers halted on account of the railroad traffic may be lowered back through the slot 10 of the drive line in succession. These drive pins will then each be automatically engaged by the next approaching driving trolley.

Such a driving trolley 26 for an installation of this type is illustrated in Fig. 5 and includes a driving dog 56 which engages the drive pin 11 and a latch dog 57, pivotally carried by a pin 58 for rotation in a counterclockwise direction only. This latch dog serves to keep the driving pin 11 of a carrier positively engaged with the driving trolley at all times and prevents the carrier from running ahead of the trolley while negotiating downgrades such as on the outbound ramp 16, or in the event the drive line is suddenly stopped.

We claim:

1. A rail terminal drive line installation wherein wheeled carriers each equipped with a depending drive pin are propelled along a supporting surface in a path defined by a guide slot by movement of an endless driving member travelling below said guide slot and carrier and having means adapted to engage the drive pin thereon, said driving member and means being supported by tracks located below said supporting surface, said rail terminal having a loading dock and a railroad track adjacent thereto; characterized by said driving member being arranged in a loop at least one portion of which consists of a crossover section intersecting and extending across said railroad track, said crossover section including means forming a continuation of said carrier supporting surface, at least a portion of said crossover section comprising a member positioned transversely of said railroad rails in a gap formed therein, the upper surface of said member forming at least a part of the said continuation of said carrier supporting surface, said member having two longitudinally aligned pairs of railroad rail sections on its said upper surface, said pairs of rail sections being separated by and forming portions of the walls of the guide slot extending longitudinally of said member and transversely of said rail sections, a tunnel formed in said member below and coextensive with said guide slot, means in said tunnel for supporting said drive line tracks and a channel for said driving member formed below and intermediate said track supporting means.

2. A rail terminal drive line installation wherein wheeled carriers each equipped with a depending drive pin are propelled along a supporting surface in a path defined by a guide slot by movement of an endless driving member traveling below said guide slot and carrier and having means adapted to engage the drive pin thereof, said driving member and means being supported by tracks located below said supporting surface and to either side of said guide slot, said rail terminal having a loading dock and a railroad track adjacent thereto; characterized by said driving member being arranged in a loop adapted to surround a railroad car positioned at said dock, at least one section of said loop crossing the said railroad track at the level thereof and below the level of said dock, said crossing section including means forming a surface extending across and to either side of the rails of said railroad track at the level of the upper surfaces thereof to form a continuation of the said supporting surface along which the carriers are propelled, said crossing section including a member positioned in a gap formed in said railroad track, said member having an upper surface forming part of said crossing section surface and being provided with two longitudinally aligned pairs of railroad rail sections, each pair of rail sections forming a continuation of the railroad track at the gap therein, a crossing section guide slot formed in said rail sections thereof, a tunnel provided in said member, said tunnel extending parallel to said guide slot and said guide slot communicating therewith, and driving member track means supported by said member in the said tunnel thereof.

References Cited in the file of this patent

UNITED STATES PATENTS

| 254,693 | Reed | Mar. 7, 1882 |
|---|---|---|
| 367,746 | Entwisle | Aug. 2, 1887 |
| 393,277 | Van Depoele | Nov. 20, 1888 |
| 399,036 | Haddock | Mar. 5, 1889 |
| 402,875 | Weir et al. | May 7, 1889 |
| 424,340 | McLaughlin | Mar. 25, 1890 |
| 426,840 | Morden | Apr. 29, 1890 |
| 428,028 | Weir et al. | May 13, 1890 |
| 432,054 | Lamplugh | July 15, 1890 |
| 439,426 | Quinn et al. | Oct. 28, 1890 |
| 471,543 | Goss | Mar. 29, 1892 |
| 1,124,268 | Bernheim | Jan. 12, 1915 |
| 1,124,271 | Bernheim | Jan. 12, 1915 |
| 1,124,272 | Bernheim | Jan. 12, 1915 |
| 2,619,370 | Leger | Nov. 25, 1952 |
| 2,621,609 | McCaul et al. | Dec. 16, 1952 |
| 2,621,610 | Boyko et al. | Dec. 16, 1952 |
| 2,660,127 | Boyko et al. | Nov. 24, 1953 |